Jan. 3, 1950 — P. M. BOURDON — 2,493,614
PNEUMATIC TIRE
Filed June 3, 1947 — 2 Sheets-Sheet 1

Inventor
Pierre M. Bourdon
by Wilkinson & Mawhinney
Attorneys

Jan. 3, 1950 P. M. BOURDON 2,493,614
PNEUMATIC TIRE
Filed June 3, 1947 2 Sheets-Sheet 2
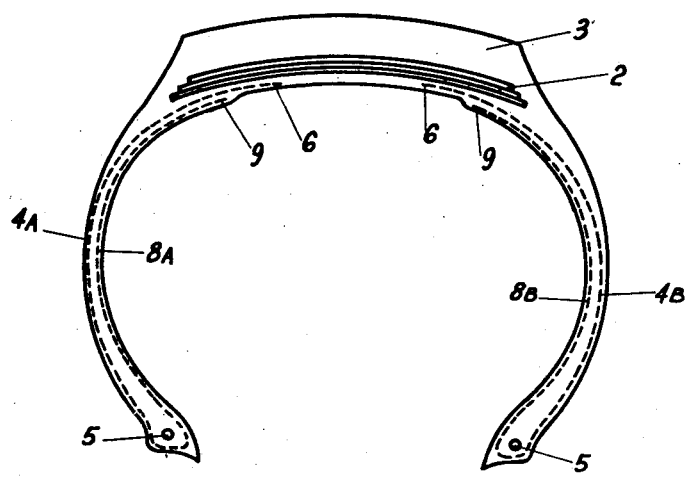
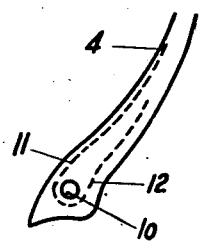
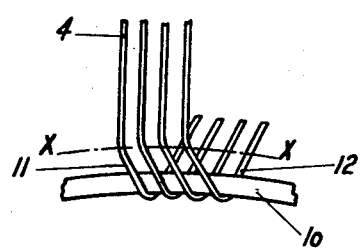
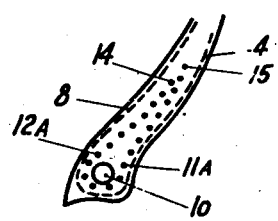
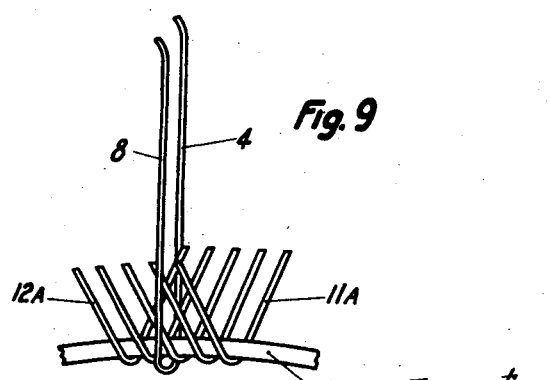
Inventor
Pierre M. Bourdon
by Wilkinson & Mawhinney
Attorneys Patented Jan. 3, 1950

2,493,614

UNITED STATES PATENT OFFICE 2,493,614

PNEUMATIC TIRE

Pierre Marcel Bourdon, Paris, France, assignor to Manufacture de Caoutchouc Michelin (Puiseux, Boulanger & Cie), Clermont-Ferrand, France Application June 3, 1947, Serial No. 752,068
In France June 4, 1946

8 Claims. (Cl. 152—356)

The present invention has for its object a method for executing pneumatic tires that shows considerable advantages from the standpoints of resistance to wear and reliability and it also covers as a novel article of manufacture the pneumatic tire obtained through application of said method.

As well known, the pneumatic tires used to this day include four principal elements, to wit:

The carcass,

The upper sheets or breaker strips reinforcing the carcass in the vicinity of the tread strip (said carcass and upper sheets are constituted by sheets of thread or of canvas embedded in rubber), The tread band that is constituted by a ply of stress-resisting rubber adapted to be provided with suitable depressions, said tread band being glued to the upper sheets and possibly to a part of the carcass located to the right hand side and to the left hand side of said sheets.

The beads located on both sides of the carcass and serving for the securing of the tire inside the flanges of the rim.

One of the chief features of the invention consists in a form of execution of the upper sheets that allows the sheet system to remain sufficiently rigid and undeformable in the longitudinal and transversal directions in order to reduce the possible transversal skidding of the tread band glued to said sheets and to increase moreover the stability of the pneumatic tire when the vehicle is running along a road.

The resulting reliability is still further increased in accordance with a preferred form of execution of the invention through the fact that the constitution of the outer sheet allows ensuring a perfectly reliable gluing of the tread band to the said outer sheets whereby the limit vehicle speed for which the tread band risks separating is considerably increased.

According to the invention, the rigidity of the upper sheet system is obtained through the fact that each sheet is constituted by metal wires embedded inside a rubber layer while the several wires are directed with reference to one another in a manner such that they form undeformable triangles. This arrangement will be termed hereinafter a triangulation. In an advantageous arrangement, the outer sheets are formed by wires that are parallel to one another in each sheet, these sheets or layers being separate, i. e., not interwoven like a fabric. In this case consequently the number of sheets is at the minimum three and the angular setting is such that the wires of the different sheets cross one another and assume at least three different directions.

Preferably, the outer sheets lie outside the carcass with reference to the air chamber. This arrangement shows the advantage of allowing the tread band to be stuck directly to the outermost sheet. This tread band is thus connected rigidly with the metal wires of the outermost sheet through the agency of the rubber thereof. As well known, the adherence of rubber to metal wires is considerable and much higher than the adherence of the rubber to textile threads, which leads to a perfectly reliable securing of the tread band and to the practical elimination of any risk of the tread band separating as mentioned hereinabove.

A further advantage of the arrangement of the outer sheet on the outside of the carcass consists in that it is possible to thus avoid any risk of perforation of the air chamber through engagement with the metal wires of the outer sheets particularly along the edges of said sheets. The threads and rubber of the carcass are sufficient for resisting possible perforation through the metal wires forming the outer sheets.

In the present specification and in the following claims the expression wire should be understood as covering not only single wires but also stranded associations of wire, cables, plaits, ribbons and the like.

It should be noted that the rigidity of the outer sheets and thereby of the tread band risks leading to a lack of comfort for the passengers.

If it is desired to remove said drawback, it is preferable to resort, according to the invention, to means for giving a greater yieldingness to the sides of the tire; said sides may be constituted, for instance, by one or a few sheets of threads parallel with one another and substantially parallel with the cross-section of the tire, say under the form of sheets of radial threads for instance.

The comfort may be still further improved by limiting the breadth of the upper sheets so that they may extend only over the surface required for holding and securing the tread band. They do not then substantially project beyond the latter, whereby they by no means hinder the collapsing flexional action of the tire.

The manner of producing the above disclosed tire would have however as a consequence an increase in the wear of the rubber forming the beads of the tire along the flanges of the rim by reason of the use of radial threads in the sides. To avoid such a wear, it is possible to provide for reinforced beads. This reinforcement to be disclosed hereinafter forms one of the characteristic features of this invention.

Accompanying drawings show by way of example various forms of execution of the invention, to wit:

Figs. 4 and 5 illustrate two modifications thereof.

Figs. 6 to 9 illustrate a form of execution of reinforced beads, as required through the fact that the sides of the tires are constituted by radial threads.

Figure 1:
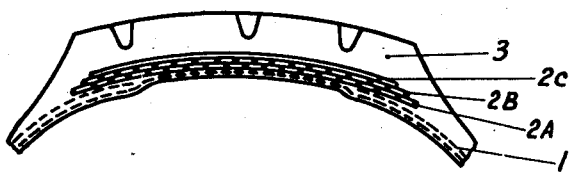
Figs. 1 and 2 are cross-sectional and plan views with torn off parts of a preferred form of execution.
Figure 2:
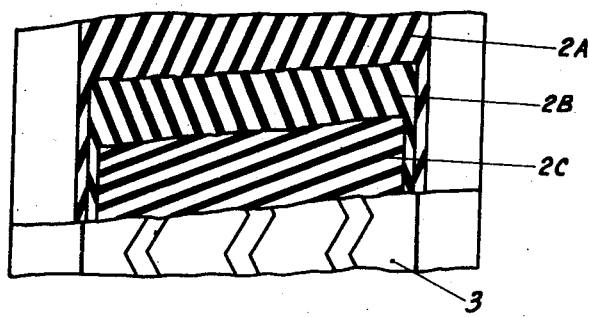

Turning now to Figs. 1 and 2, the carcass is shown diagrammatically at 1, the three upper sheets at 2A, 2B, 2C and the tread band at 3.

It is apparent that the wires forming the sheets 2A, 2B, 2C form a triangulation adapted to produce the desired rigidity of the system of upper sheets and consequently of the tread band.

These threads may assume any desired direction but, according to a preferred form of execution, the following arrangement should be adopted as a first form of execution of the invention. The wires forming two of said sheets, in the present case the sheets 2A, 2B, are located in substantially symmetrical formation with reference to the medial longitudinal cross-section of the tires so as to form with said cross-section angles ranging between about 17 and 28°. In this case the third sheet, say the sheet 20, forms preferably with said longitudinal cross-section an angle ranging between 45 and 90°. The order of superposition of the sheets may of course be selected as desired.

In a further particular arrangement forming also an advantageous form of execution, the wires in two of said sheets form with the longitudinal cross-section of the tire angles ranging between 60 and 75° while the third sheet forms with this section an angle ranging between 8 and 20°.

If the tire is submitted to considerable strain, as in the case of heavy duty trucks or lorries, it is possible to associate with the three sheets disclosed further sheets the wires of which are given suitable directions, the principle of the triangulation of the wires remaining the same, whatever may be the total number of sheets.

By way of a modification, a sheet of textile threads that is substantially perpendicular to the longitudinal cross-sectional plane may be inserted between two sheets of metal wire that are symmetrical with reference to said longitudinal sectional plane.

Figure 4:
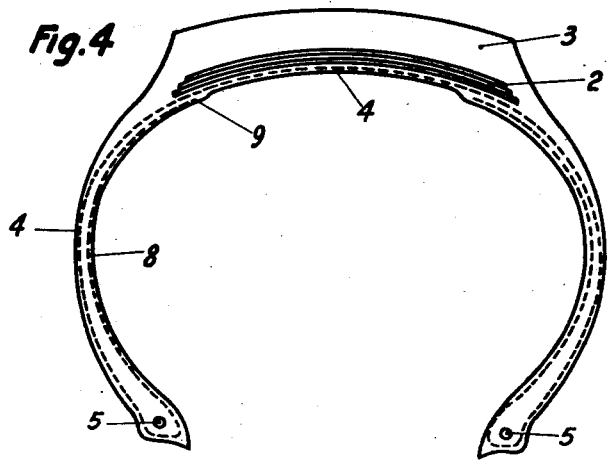

Fig. 4 illustrates a modification wherein the inner ends of the carcass sheets terminate at 9 underneath the upper sheet 2, the outer layer of the carcass sheet continuing throughout the periphery of the carcass. The object of terminating the threads of the carcass sheet underneath the upper sheets is to avoid any breaking of the rubber through a shearing thereof in the vicinity of the ends of the wires. This arrangement is rendered possible through the presence inside the upper sheets of substantially transversal wires.

In Fig. 5 there is illustrated a further modification wherein the thread sheet 4 is discontinuous inside the carcass. It includes two elementary sheets 4A, 4B folded over the outer bead rods 5 at 8A and 8B. The ends 6 and 9 of each elementary sheet of threads are again of course located underneath the upper sheet 2. The rigidity of the upper sheets and more particularly the fact of one of them being a substantially transversal sheet 2C as illustrated in Fig. 1 allows this arrangement to be possible without any substantial reduction in the resistance of the tire. The omission of the threads towards the middle of the sheet 4 between the points 6—6 or 9—9 provides for a substantial economy of material and increase in comfort.

In Figs. 6 to 9 is illustrated a manner of reinforcing the beads as required by reason of the constitution of the sides by means of radial threads.

For reinforcing the beads, it is possible for instance to resort to one of the following arrangements:

In the first case, illustrated cross-sectionally in Fig. 6 and in elevational view in Fig. 7, the sheets 4 extending from the tread towards the rod 10 enclosed inside the bead assume a slope at 11 starting from the line X—X so as to form, at their bead end with the plane of a transversal cross-section of the tire an angle that is larger than that formed previously therewith. After passing round the rod 10 the threads are folded back at 12 in the vicinity of the part 11 thereof so as to be arranged symmetrically of the latter with reference to the transversal cross-section of the tire.

Figure 3:
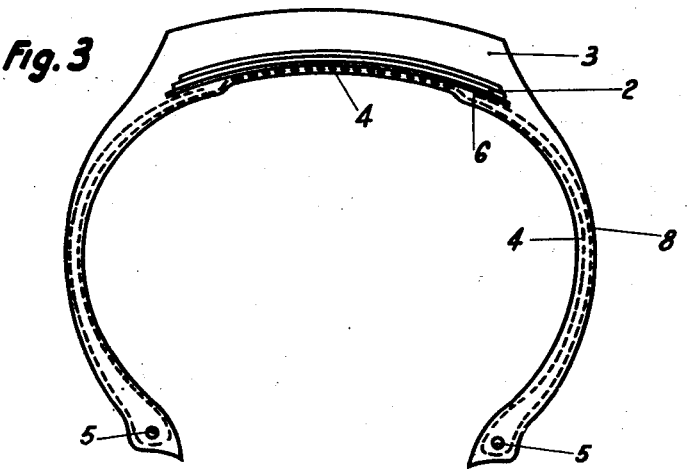
Fig. 3 shows a form of execution of a carcass.

In the second form of execution shown cross-sectionally in Fig. 8 and in elevational view in Fig. 9, there is associated with the sheet 4A of Figs. 3 and 4 a complementary sheet of textile threads or preferably of wires in proximity with the rod 10 for reinforcing the bead. This complementary sheet is designed in the same manner as the part 11—12 of the sheet 4 illustrated in Figs. 6 and 7, said complementary sheet is shown at 11A, 12A and appears as formed by elements crossing one another when the tire is seen through its lateral surface as apparent from inspection of Fig. 9.

Obviously without unduly widening the scope of the invention, it is possible to replace the metal wires by threads of any other material that is not a textile material such as threads of plastic material, glass fibres, etc. provided with similar mechanical properties and showing or adapted to show also excellent adhering properties with reference to rubber, far superior to those shown by textile threads. Consequently in the following claims, the word wire is to be understood as covering not only metallic wires, but also wires, cables, plaits, ribbons and the like made from every substance (either metallic or nonmetallic) substantially nonextensible, noncompressible and capable of adhering to rubber.

Obviously also the radial and the like threads in the lateral carcass sheets may be replaced by sufficiently yielding wires or the other thread like members.

What I claim is:

1. A tire casing comprising a carcass having flexible thread-reinforced sidewalls, a ground-contacting tread portion on the outer periphery of said carcass, and at least three separate superimposed layers of metallic wires within said carcass and substantially coextensive with said tread portion and substantially parallel to the ground-contacting surface of said tread portion, the wires in each layer being substantially parallel and the wires of each of three layers extending in different directions.

2. The tire casing set forth in the preceding claim in which the wires of two of said layers are oppositely and substantially equally inclined with respect to a plane perpendicular to the axis of said carcass.

3. The tire casing set forth in claim 1 in which the wires of two of said layers are oppositely and substantially equally inclined at an angle between about 17° and 28° with respect to a plane perpendicular to the axis of said carcass.

4. The tire casing set forth in claim 1 in which the wires of two of said layers are oppositely and substantially equally inclined at an angle between about 17° and 28° with respect to a plane perpendicular to the axis of said carcass and the wires of another layer are inclined at an angle between about 45° and 90° to said plane.

5. The tire casing set forth in claim 1 in which the wires of two of said layers are oppositely and substantially equally inclined at an angle between about 60° and 75° with respect to a plane perpendicular to the axis of said carcass and the wires of another layer are inclined at an angle between about 8° and 20° to said plane.

6. The tire casing set forth in claim 1 in which the side walls include at least one ply of reinforcing threads in which said threads lie substantially in the meridian planes of said carcass.

7. The tire casing set forth in claim 1 comprising bead cables in the bead edges of said sidewalls, at least one sheet of reinforcing threads in said sidewalls, said sheet being folded around and extending from one bead cable to the other and having opposite ends underlying at least the edges of said layers of metallic wires.

8. The tire casing set forth in claim 1 comprising bead cables in the bead edges of said sidewalls, and a strip of reinforcing parallel bias wires folded in each bead edge around said cable and having opposite edges terminating a short distance above said cable.

PIERRE MARCEL BOURDON.

REFERENCES CITED

The following references are of record in the file of this patent:

UNITED STATES PATENTS

| Number | Name | Date |
|---|---|---|
| 1,201,257 | Cobb | Oct. 17, 1916 |
| 1,358,566 | Michero | Nov. 9, 1920 |
| 1,364,870 | Ehle | Jan. 11, 1921 |
| 1,383,458 | Frazier | July 5, 1921 |
| 1,842,353 | Lorentz | Jan. 19, 1932 |
| 1,853,827 | Mallory | Apr. 12, 1932 |
| 2,277,145 | Pierce | Mar. 24, 1942 |